(12) United States Patent
Hunt (10) Patent No.: US 6,538,797 B1
(45) Date of Patent: Mar. 25, 2003

(54) PIXEL BASED GOBO CONTROL FORMAT

(75) Inventor: Mark A. Hunt, Derby (GB)

(73) Assignee: Light & Sound Design, Ltd., Birmingham (GB)

(*) Notice: Subject to any disclaimer, the term of this patent is extended or adjusted under 35 U.S.C. 154(b) by 0 days.

(21) Appl. No.: 09/679,727

(22) Filed: Oct. 4, 2000

Related U.S. Application Data (63) Continuation of application No. 09/495,585, filed on Feb. 1, 2000.
(60) Provisional application No. 60/118,195, filed on Feb. 1, 1999.

(51) Int. Cl.[7] .............................. G02B 26/00; G06T 1/00; G06K 9/00; G03F 3/08
(52) U.S. Cl. ...................... 359/291; 345/418; 345/419; 382/162; 382/181; 358/518; 358/1.9
(58) Field of Search ........................... 359/291; 382/162, 382/166, 167, 181; 358/520, 519, 539, 462, 1.9; 345/154, 418, 431; 348/661, 110; 700/19

(56) References Cited

U.S. PATENT DOCUMENTS

| | | | | |
|---|---|---|---|---|
| 5,878,413 A | * | 3/1999 | Agrawal et al. | 382/181 |
| 5,995,660 A | * | 11/1999 | Andoh et al. | 382/181 |
| 6,091,852 A | * | 7/2000 | Entleitner et al. | 382/181 |
| 6,104,830 A | * | 8/2000 | Schistad | 382/167 |
| 6,272,241 B1 | * | 8/2001 | Tattersall | 382/181 |
| 6,275,606 B1 | * | 8/2001 | Myers | 382/162 |
| 6,285,783 B1 | * | 9/2001 | Isomura et al. | 382/181 |
| 6,317,517 B1 | * | 11/2001 | Lu | 382/181 |

* cited by examiner

Primary Examiner—Loha Ben
(74) Attorney, Agent, or Firm—Fish & Richardson P.C.

(57) ABSTRACT

Techniques for use in a digital mirror device based luminaire. The techniques include using a filter as a gobo for definition.

18 Claims, 9 Drawing Sheets

PIXEL BASED GOBO CONTROL FORMAT

CROSS REFERENCE TO RELATED APPLICATIONS

This application is a continuation of Ser. No. 09/495,585 filed Feb. 1, 2000 and claims the benefit of the U.S. Provisional Application No. 60/118,195, filed on Feb. 1, 1999.

FIELD

The present invention relates to a system of controlling light beam pattern ("gobo") shape in a pixilated gobo control system.

BACKGROUND

Commonly assigned patent application Ser. No. 08/854,353, now U.S. Pat. No. 6,188,933, describes a stage lighting system which operates based on computer-provided commands to form special effects. One of those effects is control of the shape of a light pattern that is transmitted by the device. This control is carried out on a pixel-by-pixel basis, hence referred to in this specification as pixilated. The embodiment describes using a digital mirror device, but other x-y controllable devices such as a grating light valve, are also contemplated.

The computer controlled system includes a digital signal processor 106 which is used to create an image command. That image command controls the pixels of the x-y controllable device to shape the light that it is output from the device.

The system described in the above-referenced application allows unparalleled flexibility in selection of gobo shapes and movement. This opens an entirely new science of controlling gobos. The present inventors found that, unexpectedly, even more flexibility is obtained by a special control language for controlling those movements.

SUMMARY

The present disclosure defines aspects that facilitate communicating with a point controllable device to form special electronic light pattern shapes. More specifically, the present application describes different aspects of communication with an electronic gobo. These aspects include improved processing or improved controls for the gobo.

BRIEF DESCRIPTION OF THE DRAWINGS

These and other aspects of the invention will now be described with reference to the attached drawings, in which:

FIGS. 6(1) through 6(8) show a z-axis flipping gobo;

DESCRIPTION OF THE PREFERRED EMBODIMENT

Figure 1:
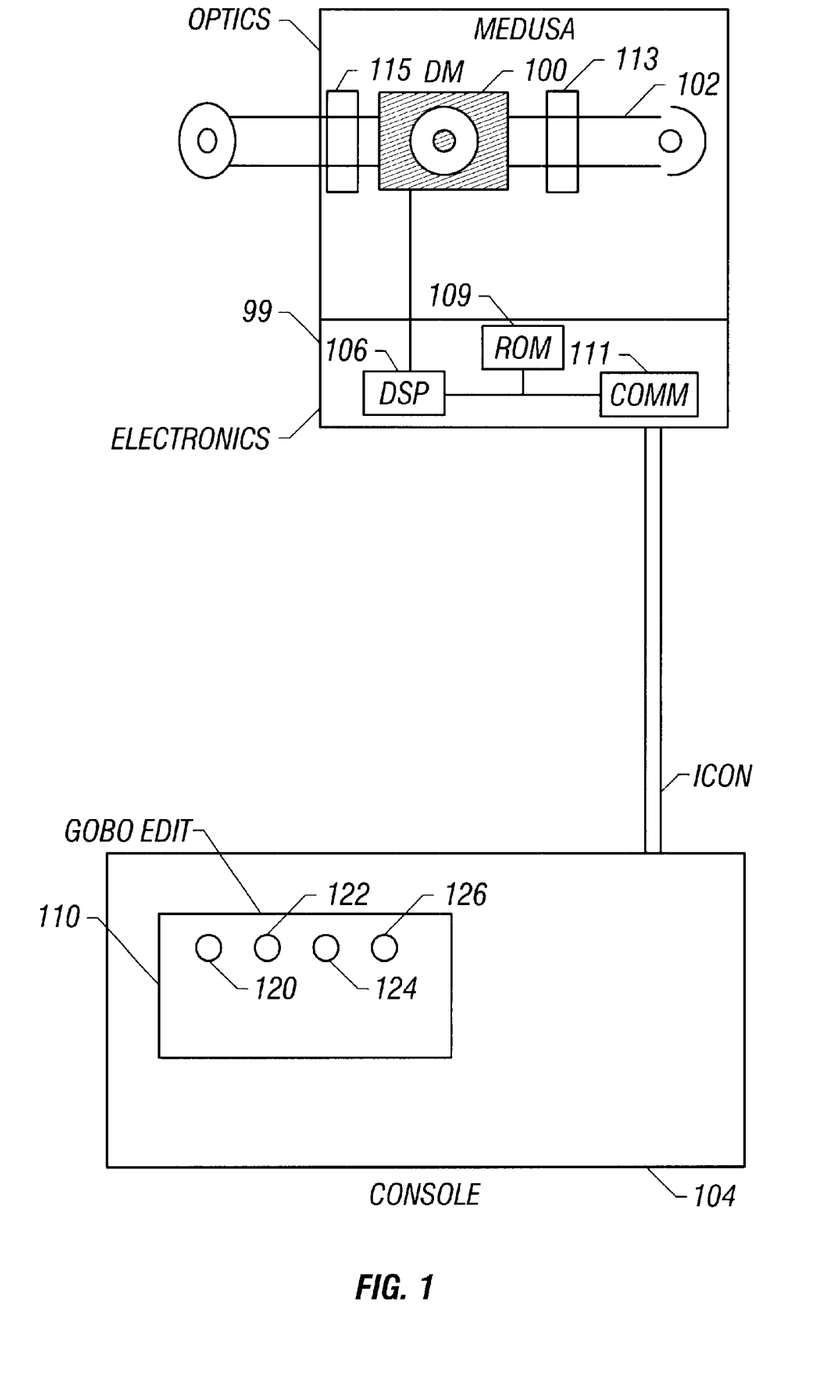
FIG. 1 shows a block diagram of the basic system operating the embodiment.

FIG. 1 shows a block diagram of the hardware used according to the preferred embodiment. As described above, this system uses a digital mirror device 100, which has also been called a digital. mirror device ("DMD") and a digital light processor device ("DLP"). More generally, any system which allows controlling shape of light on a pixel basis, including a grating light valve, could be used as the light shaper. This light shaper forms the shape of light which is transmitted. FIG. 1 shows the light being transmitted as 102, and shows the transmitted light. The information for the digital mirror 100 is calculated by a digital signal processor 106. Information is calculated based on local information stored in the lamp, e.g., in ROM 109, and also in information which is received from the console 104 over the communication link.

The operation is commanded according to a format.

The preferred data format provides 4 bytes for each of color and gobo control information.

The most significant byte of gobo control data, ("dfGobo") indicates the gobo type. Many different gobo types are possible. Once a type is defined, the gobo formed from that type is represented by a number. That type can be edited using a special gobo editor described herein. The gobo editor allows the information to be modified in new ways, and forms new kinds of images and effects.

The images which are used to form the gobos may have variable and/or moving parts. The operator can control certain aspects of these parts from the console via the gobo control information. The type of gobo controls the gobo editor to allow certain parameters to be edited.

The examples given below are only exemplary of the types of gobo shapes that can be controlled, and the controls that are possible when using those gobo shapes. Of course, other controls of other shapes are possible and predictable based on this disclosure.

First Embodiment

A first embodiment is the control of an annulus, or "ring" gobo. The DMD 100 in FIG. 1 is shown with the ring gobo being formed on the DMD. The ring gobo is type 000A. When the gobo type 0A is enabled, the gobo editor 110 on the console 104 is enabled and the existing gobo encoders 120, 122, 124, and 126 are used. The gobo editor 110 provides the operator with specialized control over the internal and the external diameters of the annulus, using separate controls in the gobo editor.

The gobo editor and control system also provides other capabilities, including the capability of timed moves between different edited parameters. For example, the ring forming the gobo could be controlled to be thicker. The operation could then effect a timed move between these "preset" ring thicknesses. Control like this cannot even be attempted with conventional fixtures.

Another embodiment is a composite gobo with moving parts. These parts can move though any path that ia programmed in the gobo data itself. This is done in response to the variant fields in the gobo control record, again with timing. Multiple parts can be linked to a single control allowing almost unlimited effects.

Another embodiment of this system adapts the effect for an "eye" gobo, where the pupil of the eye changes its position (look left, look right) in response to the control.

Yet another example is a Polygon record which can be used for forming a triangle or some other polygonal shape.

The control can be likened to the slider control under a QuickTime movie window, which allows you to manually move to any point in the movie. However, our controls need not be restricted to timelines.

Even though, such moving parts are used, scaling and rotation on the gobo is also possible.

The following type assignments are contemplated:

00_0F=FixedGobo (with no "moving parts")
10_1F=SingleCntrl (with 1 "moving part")
20_2F=DoubleCntrl (with 2 "moving parts")
30_FF=undefined, reserved.

The remaining control record bytes for each type are defined as follows:

| Byte: | dfGobo2 | dfGobo3 | dfGobo4 | #gobos/type, | total memory |
|---|---|---|---|---|---|
| FixedGobo: | ID[23:16] | ID[15:8] | ID[7:0] | 16M/type | 256M |
| SingleCntrl: | ID[15:8] | ID[7:0] | control#1 | 64k/type | 1M |
| DoubleCntrl: | ID[7:0] | control#2 | control#1 | 256/type | 4k |

As can be seen from this example, this use of the control record to carry control values does restrict the number of gobos which can be defined of that type, especially for the 2_control type.

Console Support

The use of variant part gobos requires no modifications to existing co translate directly to the values of the 4 bytes sent in the communications data packet as follows:

| Byte: dfGobo | dfGobo2 | dfGobo3 | dfGobo4 |
|---|---|---|---|
| Enc: TopRight | MidRight | BotRight | BotLeft |
| FixedGobo: | ID[23:16] | ID[15:8] | ID[7:0] |
| SingleCntrl: | ID[15:8] | ID[7 0] | control#1 |
| DoubleCntrl: | ID[7:0] | control#2 | control#1 |

These values would be part of a preset gobo, which could be copied as the starting point.

Once these values are set, the third and fourth channels automatically become the inner/outer radius controls. Using two radii allows the annulus to be turned "inside out".

Each control channel's data always has the same meaning within the console. The console treats these values as simply numbers that are passed on. The meanings of those numbers, as interpreted by the lamps change according to the value in dfGobo.

The lamp will always receives all 4 bytes of the gobo data in the same packet. Therefore, a "DoubleCntrl" gobo will always have the correct control values packed along with it.

Hence, the console needs no real modification. If a "soft" console_ is used, then name reassignments and/or key reassignments may be desirable.

Timing

For each data packet, there is an associated "Time" for gobo response. This is conventionally taken as the time allotted to place the new gobo in the light gate. This delay has been caused by motor timing. In this system, variant gobo, the control is more dynamically used. If the non-variant parts of the gobo remain the same, then it is still the same gobo, only with control changes. Then, the time value is interpreted as the time allowed for the control change.

Since different gobo presets (in the console) can reference the same gobo, but with different control settings, this allows easily programmed timed moves between different annuli, etc.

Internal Workings

When the gobo command data is extracted from the packet at the lamp, the dfGobo byte is inspected first, to see if either dfGobo3 or dfGobo4 are significant in selecting the image. In the case of the "Cntrl" variants, one or both of these bytes is masked out, and the resulting 32-bit number is used to search for a matching gobo image (by Gobo_1D) in the library stored in the lamo's ROM 109.

If a matching image is found, and the image is not already in use, then the following steps are taken:

1) The image data is copied into RAM, so that its fields may be modified by the control values. This step will be skipped if the image is currently active.

2) The initial control values are then recovered from the data packet, and used to modify certain fields of the image data, according to the control records.

3) The image is drawn on the display device, using the newly-modified fields in the image data.

If the image is already in use, then the RAM copy is not altered. Instead, a time-sliced task is set up to slew from the existing control values to those in the new data packet, in a time determined by the new data packet.

At each vertical retrace of the display, new control values are computed, and steps 2 (using the new control values) and 3 above are repeated, so that the image appears modified with time.

The Image Data Records

All images stored in the lamp are in a variant record format:
Header
Length 32 bits, offset to next gobo in list.
Gobo_1D 32 bits, serial number of gobo.
Gobo Records
Length 32 bits, offset to next record.
Opcode 16 bits, type of object to be drawn.
Data Variant part—data describing object.
_Length 32 bits, offset to next record.
Opcode 16 bits, type of object to be drawn.
Data Variant part—data describing object.
_EndMarker 64 bits, all zeroes—indicates end of gobo data.
+ Next gobo, or End Marker, indicating end of gobo list.

Gobos with controls are exactly the same, except that they contain control records, which describe how the control values are to affect the gobo data. Each control record contains the usual length and Opcode fields, and a field containing the control number (1 or 2).

These are followed by a list of "field modification" records. Each record contains information about the offset (from the start of the gobo data) of the field, the size (8, 16 or 32 bits) of the field, and how its value depends on the control value.

Length 32 bits, offset to next record
Opcode 16 bits=control_record (constant)
CntrlNum 16 bits=1 or 2 (control number) /* field modification record #1 * /
Address 16 bits, offset from start of qobo to affected field.
Flags 16 bits, information about field (size, signed, etc)
Scale 16 bits, scale factor applied to control before use
zPoint 16 bits, added to control value after scaling. /* field modification record #2 */
Address 16 bits, offset from start of gobo to affected field.
Flags 16 bits, information about field (size, signed, etc)

Scale 16 bits, scale factor applied to control before use
zPoint 16 bits, added to control value after scaling.

As can be seen, a single control can have almost unlimited effects on the gobo, since ANY values in the data can be modified in any way, and the number of field modification records is almost unlimited.

Note that since the control records are part of the gobo data itself, they can have intimate knowledge of the gobo structure. This makes the hard-coding of field offsets acceptable.

In cases where the power offered by this simple structure is not sufficient, a control record could be defined which contains code to be executed by the processor. This code would be passed parameters, such as the address of the gobo data, and the value of the control being adjusted.

Example Records

The Annulus record has the following format:
Length 32 bits
Opcode 16 bits,=type_annulus
Pad 16 bits, unused
Centre_x 16 bits, x coordinate of centre
Centre_y 16 bits, y coordinate of centre
OuterRad 16 bits, outside radius (the radii get swapped when drawn if their values are in the wrong order)
InnerRad 16 bits, inside radius.

It can be seen from this that it is easy to "target" one of the radius parameters from a control record. Use of two control records, each with one of the radii as a target, would provide full control over the annulus shape.

Note that if the center point coordinates are modified, the annulus will move around the display area, independent of any other drawing elements in the same gobo's data.

The Polygon record for a triangle has this format:

Length 32 bits
Opcode 16 bits,=type_polygon
Pad 16 bits, vertex count=3
Centre_x 16 bits, x coordinate of vertex
Centre_y 16 bits, y coordinate of vertex
Centre_x 16 bits, x coordinate of vertex
Centre_y 16 bits, y coordinate of vertex
Centre_x 16 bits, x coordinate of vertex
Centre_y 16 bits, y coordinate of vertex.

It is easy to modify any of the vertex coordinates, producing distortion of the triangle.

The gobo data can contain commands to modify the drawing environment, by rotation, scaling, offset, and color control, the power of the control records is limitless.

Second Embodiment

This second embodiment provides further detail about implementation once the gobo information is received.

Figure 2:
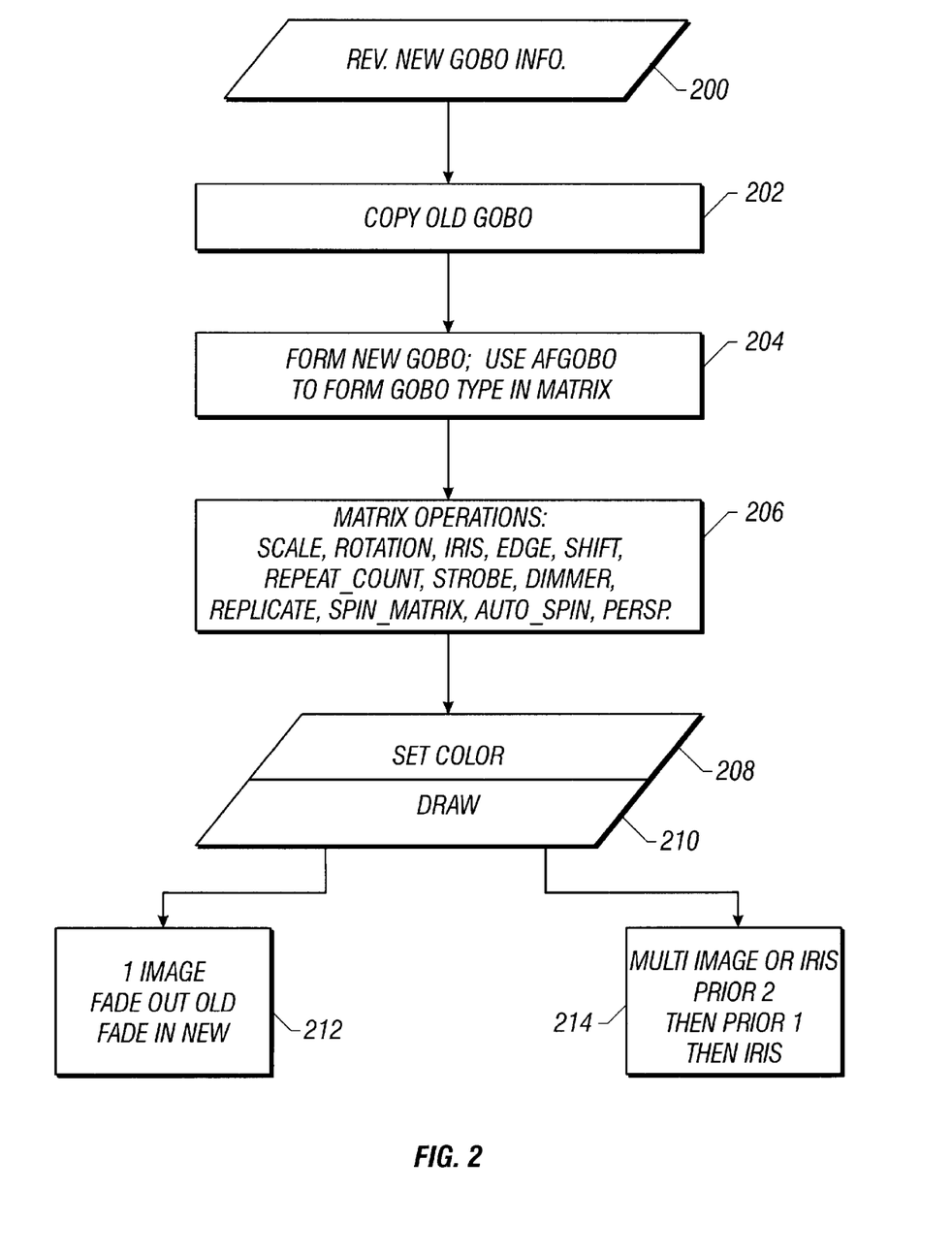
FIG. 2 shows a basic flowchart of operation.

Gobo information is, at times, being continuously calculated by DSP 106. The flowchart of FIG. 2 shows the handling operation that is carried out when new gobo information is received.

At step 200, the system receives new gobo information. In the preferred embodiment, this is done by using a communications device 111 in the lamp 99. The communications device is a mailbox which indicates when new mail is received. Hence, the new gobo information is received at step 200 by determining that new mail has been received.

At step 202, the system copies the old gobo and switches pointers. The operation continues using the old gobo until the draw routine is called later on.

At step 204, the new information is used to form a new gobo. The system uses a defined gobo ("dfGobo") as discussed previously which has a defined matrix. The type dfGobo is used to read the contents from the memory 109 and thereby form a default image. That default image is formed in a matrix. For example, in the case of an annulus, a default size annulus can be formed at position 0,0 in the matrix. An example of forming filled balls is provided herein.

Step 206 represents calls to subroutines. The default gobo is in the matrix, but the power of this system is its ability to very easily change the characteristics of that default gobo. In this embodiment, the characteristics are changed by changing the characteristics of the matrix and hence, shifting that default gobo in different ways. The matrix operations, which are described in further detail herein, include scaling the gobo, rotation, iris, edge, strobe, and dimmer. Other matrix operations are possible. Each of these matrix operations takes the default gobo, and does something to it.

For example, scale changes the size of the default gobo. Rotation rotates the default gobo by a certain amount. Iris simulates an iris operation by choosing an area of interest, typically circular, and erasing everything outside that area of interest. This is very easily done in the matrix, since it simply defines a portion in the matrix where all black is written.

Edge effects carry out certain effects on the edge such as softening the edge. This determines a predetermined thickness, which is translated to a predetermined number of pixels, and carries out a predetermined operation on the number of pixels. For example, for a 50% edge softening, every other pixel. can be turned off. The strobe is in effect that allows all pixels to be turned on and off at a predetermined frequency, i.e., 3 to 10 times a second. The dimmer allows the image to be made dimmer by turning.off some of the pixels at predetermined times.

The replicate command forms another default gobo, to allow two different gobos to be handled by the same record. This will be shown with reference to the exemplary third embodiment showing balls. Each of those gobos are then handled as the same unit and the entirety of the gobos can be, for example, rotated. The result of step 206 and all of these subroutines that are called is that the matrix includes information about the bits to be mapped to the digital mirror 100.

At step 208, the system then obtains the color of the gobos from the control record discussed previously. This gobo color is used to set the appropriate color changing circuitry 113 and 115 in the lamp 99. Note that the color changing circuitry is shown both before and after the digital mirror 100. It should be understood that either of those color changing circuits could be used by itself.

At step 210, the system calls the draw routine in which the matrix is mapped to the digital mirror. This is done in different ways depending on the number of images being used. Step 212 shows the draw routine for a single image being used as the gobo. In that case, the old gobo, now copied as shown in step 202, is faded out while the new gobo newly calculated is faded in. Pointers are again changed so that the system points to the new gobo. Hence, this has the effect of automatically fading out the old gobo and fading in the new gobo.

Step 214 schematically shows the draw routine for a system with multiple images for an iris. In that system, one of the gobos is given priority over the other. If one is brighter than the other, then that one is automatically given priority.

The one with priority 2, the lower priority 1, is written first. Then the higher priority gobo is written. Finally, the iris is written which is essentially drawing black around the edges of the screen defined by the iris. Note that unlike a conventional iris, this iris can take on many different shapes. The iris can take on not just a circular shape, but also an elliptical shape, a rectangular shape, or a polygonal shape. In addition, the iris can rotate when it is non-circular so that for the example of a square iris, the edges of the square can actually rotate.

Returning to step 206, in the case of a replicate, there are multiple gobos in the matrix. This allows the option of spinning the entire matrix, shown as thin matrix.

Figure 3:
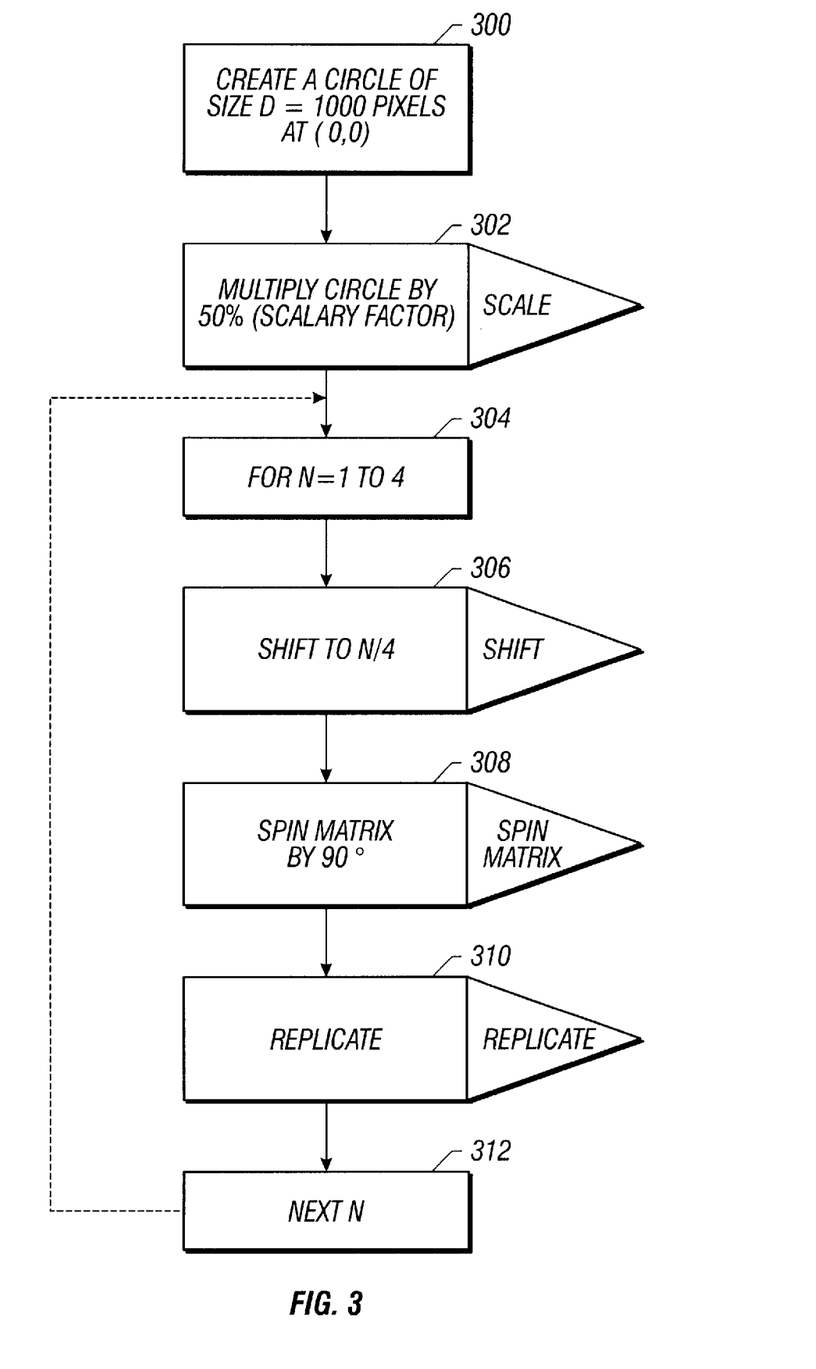
FIG. 3 shows a flowchart of forming a replicating circles type gobo.
Figure 4A:
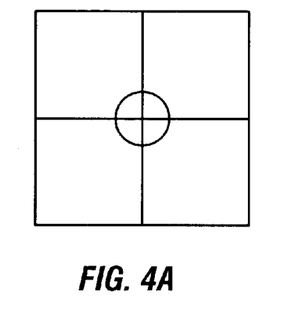
FIGS. 4A through 4G show respective interim results of carrying out the replicating circles operation.

An example will now be described with reference to the case of repeating circles. At step 200, the new gobo information is received indicating a circle. This is followed by the other steps of 202 where the old gobo is copied, and 204 where the new gobo is formed. The specific operation forms a new gobo at step 300 by creating a circle of size diameter equals 1000 pixels at origin 00. This default circle is automatically created. FIG. 4A shows the default gobo which is created, a default size circle at 00. It is assumed for purposes of this operation that all of the circles will be the same size.

Figure 4B:
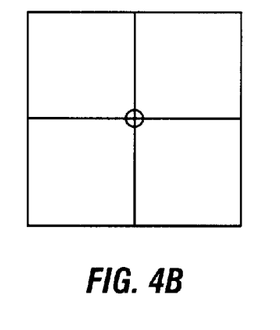
Figure 4C:
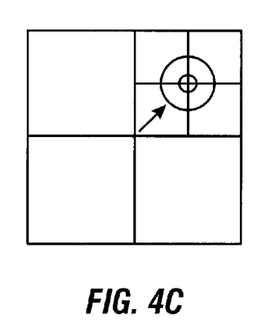
Figure 4D:
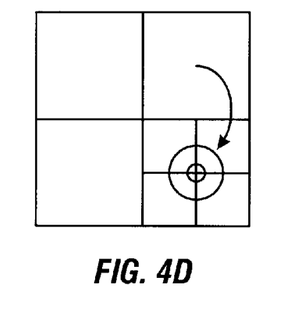

At step 302, the circle is scaled by multiplying the entire circle by an appropriate scaling factor. Here, for simplicity, we are assuming a scaling factor of 50% to create a smaller circle. The result is shown in FIG. 4B. A gobo half the size of the gobo of FIG. 4A is still at the origin. This is actually the scale of the subroutine as shown in the right portion of step 302. Next, since there will be four repeated gobos in this example, a four-loop is formed to form each of the gobos at step 304. Each of the gobos is shifted in position by calling the matrix operator shift. In this example, the gobo is shifted to a quadrant to the upper right of the origin. This position is referred to as □ over 4 in the FIG. 3 flowchart and results in the gobo being shifted to the center portion of the top right quadrant as shown in FIG. 4C. This is again easily accomplished within the matrix by moving the appropriate values. At step 308, the matrix is spun by 90 degrees in order to put the gobo in the next quadrant as shown in FIG. 4D in preparation for the new gobo being formed into the same quadrant. Now the system is ready for the next gobo, thereby calling the replicate command which quite easily creates another default gobo circle and scales it. The four-loop is then continued at step 312.

Figure 4E:
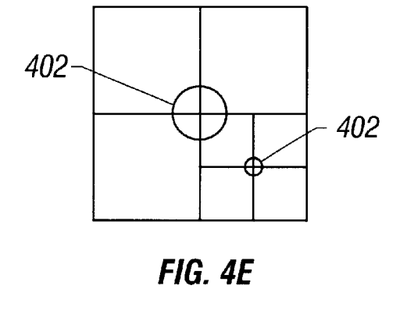
Figure 4F:
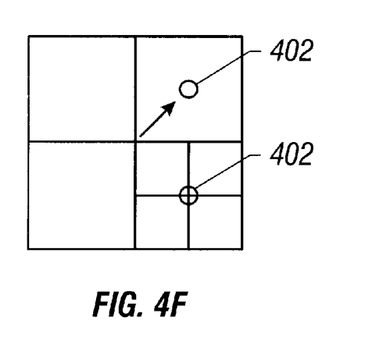
Figure 4G:
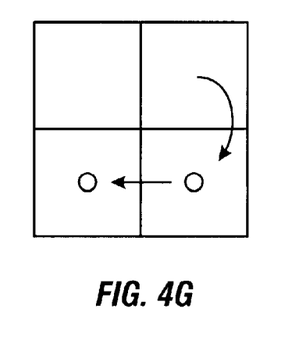

The replicate process is shown in FIG. 4E where a new gobo 402 is formed in addition to the existing gobo 400. The system then passes again through the four-loop, with the results being shown in the following figures. In FIG. 4F, the new gobo 402 is again moved to the upper right quadrant (step 306). In FIG. 4G, the matrix is again rotated to leave room for a new gobo in the upper right quadrant. This continues until the end of the four-loop. Hence, this allows each of the gobos to be formed.

Since all of this is done in matrix operation, it is easily programmable into the digital signal processor. While the above has given. the example of a circle, it should be understood that this scaling and moving operation can be carried out for anything. The polygons, circles, annulus, and any other shape is easily scaled.

The same operation can be carried out with the multiple parameter gobos. For example, for the case of a ring, the variable takes the form annulus (inner R, outer R, x and y). This defines the annulus and turns of the inner radius, the outer radius, and x and y offsets from the origin. Again, as shown in step 3, the annulus is first written into the matrix as a default size, and then appropriately scaled and shifted. In terms of the previously described control, the ring gobo has two controls: control 1 and control 2 defined the inner and outer radius.

Each of these operations is also automatically carried out by the command repeat count which allows easily forming the multiple position gobo of FIGS. 4A–4G. The variable auto spin defines a continuous spin operation. The spin operation commands the digital signal processor to continuously spin the entire matrix by a certain amount each time.

Figure 5:
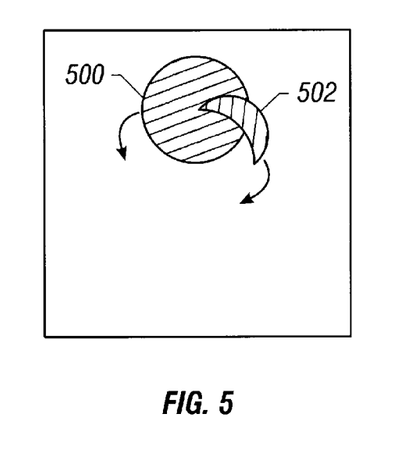
FIG. 5 shows the result of two overlapping gobos rotating in opposite directions.
Figure 6:
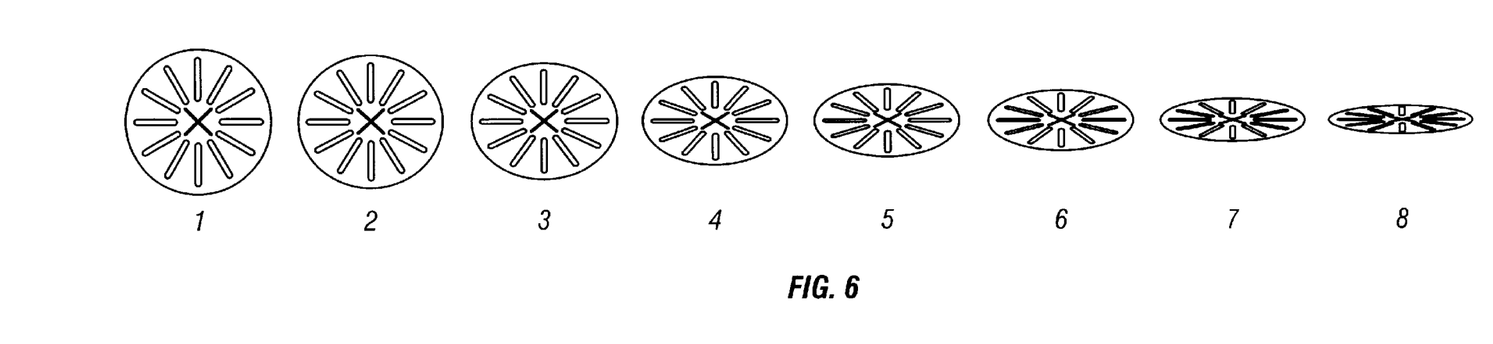

One particularly interesting feature available from the digital mirror device is the ability to use multiple gobos which can operate totally separately from one another raises the ability to have different gobos spinning in different directions. When the gobos overlap, the processor can also calculate relative brightness of the two gobos. In addition, one gobo can be brighter than the other. This raises the possibility of a system such as shown in FIGS. 5A–5C. Two gobos are shown spinning in opposite directions: the circle gobo 500 is spinning the counterclockwise direction, while the half moon gobo 502 is spinning in the clockwise direction. At the overlap, the half moon gobo which is brighter than the circle gobo, s visible over the circle gobo. Such effects were simply not possible with previous systems. Any matrix operation is possible, and only a few of those matrix operations have been described herein.

A final matrix operation to be described is the perspective transformation. This defines rotation of the gobo in the Z axis and hence allows adding depth and Perspective to the gobo. For each gobo for which rotation is desired, a calculation is preferably made in advance as to what the gobo will look like during the Z axis transformation. For example, when the gobo is flipping in the Z axis, the top goes back and looks smaller while the front comes forward and looks larger. FIGS. 6(1)–6(8) show the varying stages of the gobo flipping. In FIG. 6(8), the gobo has its edge toward the user. This is shown in FIG. 6(8) as a very thin line, e.g., three pixels wide, although the gobo could be zero thickness at this point. Automatic algorithms are available for such Z axis transformation, or alternatively a specific Z axis transformation can be drawn and digitized automatically to enable a custom look.

Third Embodiment

The gobo record format described above can have two gobos therein. These two gobos can be gobo planes, which can be used to project one image superimposed over another image in a predefined way. For example, a first image can be a pattern that emits light, e.g., a standard gobo. The second image can be totally transparent, or can have holes through which the first image can be seen.

Analog gobos often project light through two gobos. The light is then projected through the intersection between the two gobos. Effectively, this takes an AND function between the gobos. Light will only be passed in places where both gobos are open.

In the present system, any function between two images can be projected as an overall gobo shape. The system can, e.g., project an "or" operation between the two images. Moreover, the two images can be projected in separate colors. The operation could be carried out in software.

Figure 7A:
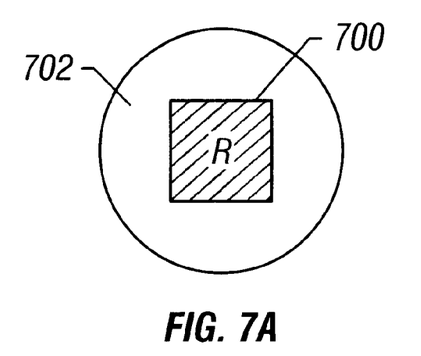
FIGS. 7A–7C show overlapping gobos and then color of overlap.

A first gobo shown in FIG. 7A is a square gobo. For purposes of this example, the square gobo is projected in red ("R"), forming a first red lighted portion. The exterior non-projected portion 702 is black.

Figure 7B:
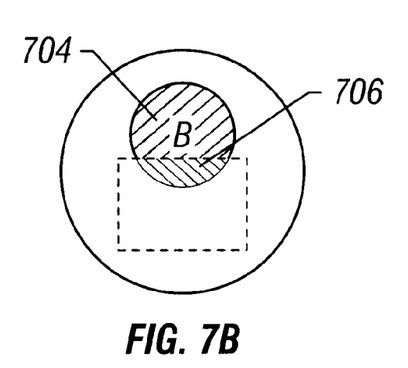
Figure 7C:
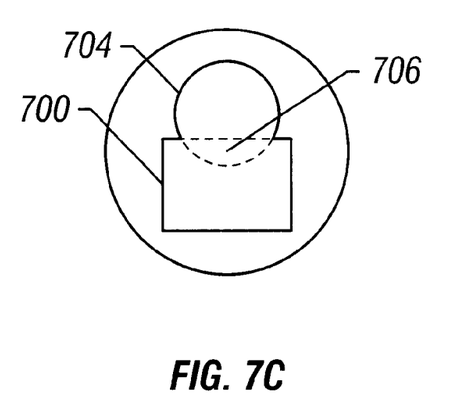

FIG. 7B shows the second gobo to be combined with the first gobo. The second gobo is an off-center circle 704 to be projected in blue ("B"). The AND between these two gobos would transmit only the intersection between the two gobos, shown by the hatched portion 706. Moreover, this portion could only be transmitted in the additive or subtractive combination between the two colors, red and blue.

The present system defines the two images as conceptually being separate planes. This enables transmitting the "or", or any other combination, between the two images. Both the first image 700 and the second image 704 are displayed. Moreover, the intersection portion of the image 706 can be made in any desired color, either the color of either, the color of the subtractive combination, or a totally different color. While this system describes an "or" operation, it also encompasses any combination between the gobos: e.g., exclusive or, Schmitt-triggered (hysteresis-induced combination) AND/OR, or others.

The gobo operation is also simplified and made more efficient by using a transfer controller as described herein.

Figure 8:
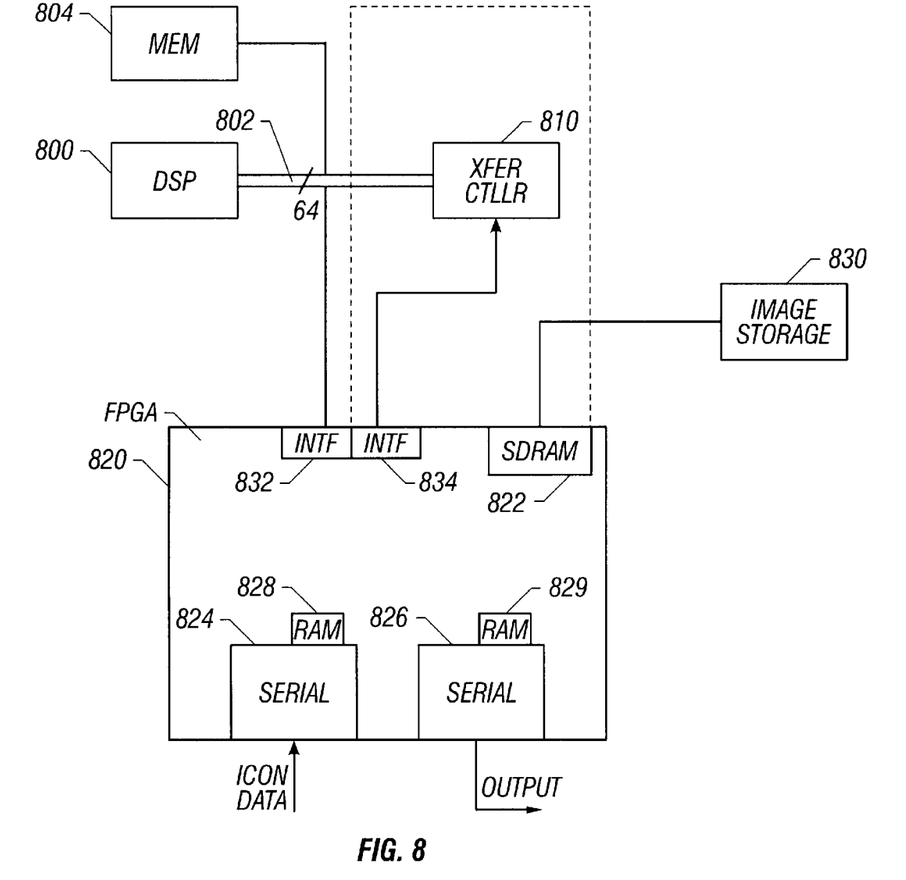
FIG. 8 shows the black diagram of the system including a transfer controller.

FIG. 8 shows the basic block diagram of this embodiment. The Digital Signal Processor (DSP) 800 effectively functions as the central processing unit. A DSP for this embodiment is the TI TMS 320C80. This has a 64-bit bus 802. Memory 804 is attached to the bus 802. The memory 804 effectively forms a working portion. A transfer controller 810 is provided and allows increased speed. The transfer controller can take control of the bus and can carry out certain functions. One such function is a direct memory access. This allows moving information from the program memory 804 to a desired location.

The transfer controller receives information about the data to be moved, including the start location of the data, the number of bytes of the data, and the end location of the data. The destination and operation is also specified by the data 809. The transfer controller 810 then takes the data directly from the memory 804, processes it, and returns it to the memory or to the DLP without DSP intervention. The CPU can then therefore instruct the transfer controller to take some action and then can itself do something else.

Hardware block 820 also connects to the bus 802. This is preferably formed from a Field Programmable Gate Array (FPGA). The FPGA can be configured into logical blocks as shown. The DSP also sends commands that reconfigure the FPGA as needed. The FPGA can be reconfigured to form fast Synchronous Dynamic Random Access Memory (SDRAM) shown as 822.

DSP 800 can be a TI TMS 320C80. This device includes an associated transfer controller which is a combined memory controller and DMA (direct memory access) machine. It handles the movement of data and instructions within the system as required by the master processor, parallel processors, video controller, and external devices.

The transfer controller performs the following data-movement and memory-control functions:

MP and ADSP instruction-cache fills,
MP data-cache fills and dirty-block write-back,
MP and ADSP packet transfers (PTs),
Externally initiated packet transfers (XPTs),
VC packet transfers (VCPTs),
MP and ADSP direct external accesses (DEAs),
VC shift-register-transfer (SRTs),
DRAM refresh, and
External bus requests.

Operations are performed on the cache sub-block as requested by the processors' internal cache controllers. DEA operations transfer off-chip data directly to or from processor registers. Packet transfers are the main data transfer operations and provide an extremely flexible method for moving multidimensional blocks of data (packets) between on-chip and/or off-chip memory.

Key features of this specific transfer controller include:

Crossbar interface,
64-bit data path,
Single-cycle access,
External memory interface,
4G-byte address range dynamically configurable memory cycles,
Bus size of 8, 16, 32, or 64 bits,
Selectable memory page size,
Selectable row/column address multiplexing,
Selectable cycle timing,
Big or little endian operation Cache, VRAM, and refresh controller,
Programmable refresh rate,
VRAM block-write support,
Independent source and destination addressing,
Autonomous address generation based on packet transfer parameters;
Data can be read and written at different rates
Numerous data merging and spreading functions can be performed during transfers; and
Intelligent request prioritization.

Hence, the transfer controller allows definition of the limits of the message/data. Then, the information can be automatically handled. The transfer controller can also generate a table of end points, carry out direct-memory access, and manipulate the data while transferring the data.

The SDRAM 822 can be used as fast-image memory, and can be connected, for example, to an image storage memory 830. The FPGA can also be configured to include serial interfaces 824, 826 with their associated RAM 828, 829 respectively. Other hardware components also can be configured by the FPGA.

Since the FPGA can be reconfigured under control of the digital signal processor 800, the FPGA can be reconfigured dynamically to set an appropriate amount of SDRAM 822. For example, if a larger image or image processing area is necessary, the FPGA can be reconfigured to make more of its area into image memory. If a smaller image is desired, less of the FPGA can be made into SDRAM, allowing more of the FGPA for other hardware functions. Moreover, the interfaces 832, 834 can be dynamically reconfigured. For example, the baud rate can be changed, bus width can be reconfigured, and the like.

The video controller and line buffer 1114 can also be formed from the field-programmable gate array.

The serial receiver 824 receives the lamp data from the controller, as described in U.S. Pat. No. 5,969,485. The serial driver 826 produces a serial output that can drive, for example, an RS422 bus that runs the motors.

The C80 DSP includes the transfer controller as a part thereof.

Figure 11:
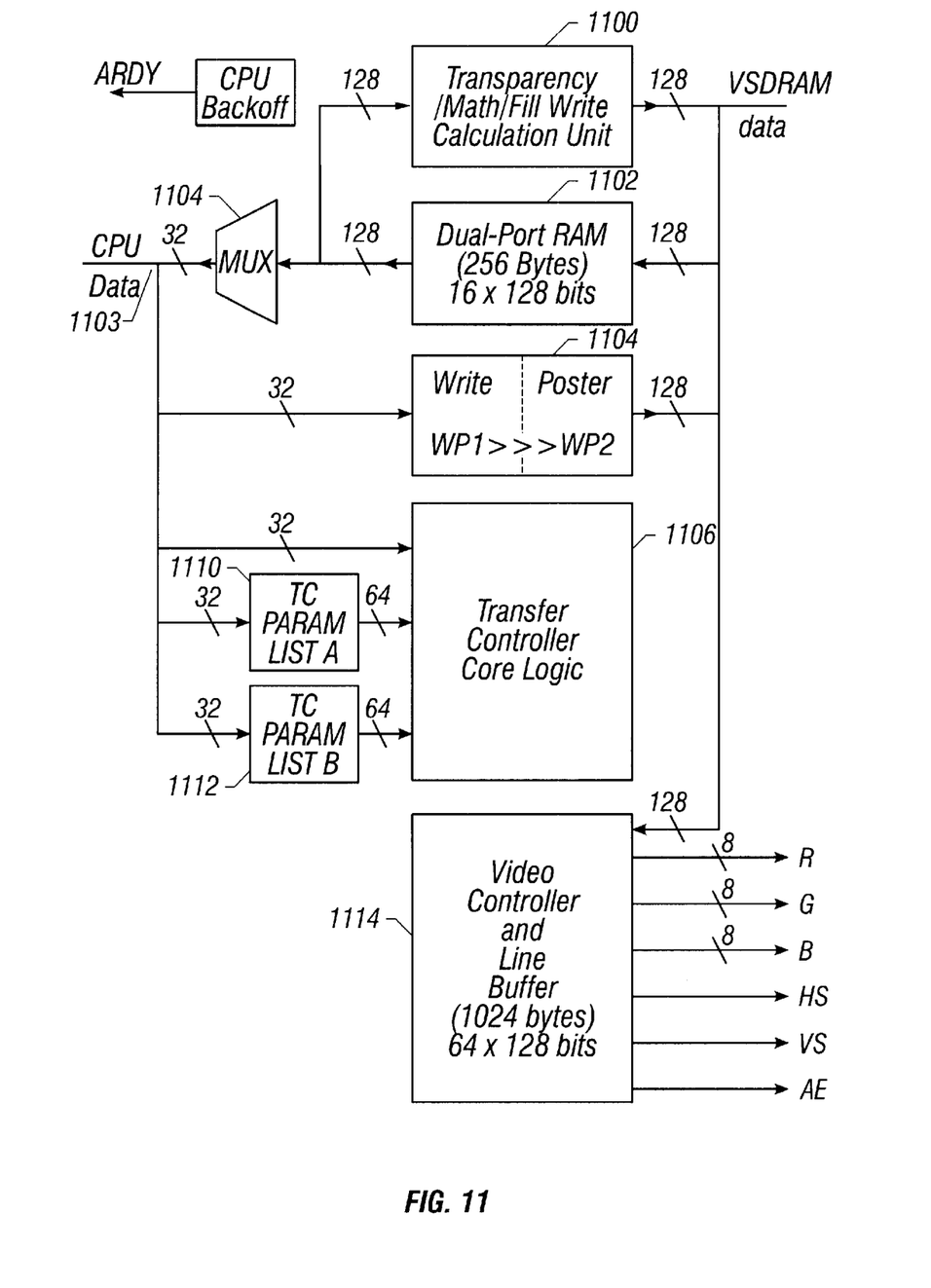
FIG. 11 shows a transfer controller made from an FPGA.

An alternative embodiment uses a different DSP. The functions of the transfer controller are then replicated in the FPGA, as desired. For example, an alternative possible DSP is the C6201 which uses the Very Large Instruction Word "VLIW" architecture. This system can use, for example, 128-bit instructions. However, since this is connected to the 32-bit data bus, a transfer controller could be highly advantageous. This would enable the equivalent of direct memory access from the memory. FIG. 11 shows the gate array schematic of this alternate embodiment in which the transfer controller is part of the FPGA.

A second embodiment of the gate array logic, as arranged according to the present system, is shown in FIG. 11. This gate array logic is formed in the field-programmable gate array 820 to carry out many of the functions described herein. Block 1100 corresponds to a transparency device which calculates values associated with transparency.

Block 1102 is a dual-port RAM which receives the VLIW at one port thereof, and outputs that value to a multiplexer 1104, which outputs it as a 32 bit signal used by the CPU/DSP.

Transfer controller 1106 has the functionality discussed above. It is controlled directly by the CPU data received on line 1105. The transfer controller can have two lists of parameters, each 64 bits in width. These values are received on the list receivers 1110, 1112.

Another issue noted by the current inventors is the size of images. If possible, it is desirable to avoid using uncompressed images. For example, one simple form image to manipulate is a bitmap, also known as a ".bmp" type image. The bitmap represents each pixel of the image by a number of bits, e.g., for an 8-bit 3-primary color image, each pixel would require 24 bits. This can, unfortunately, use incredible amounts of storage. However, since the bit map has a 1-to-1 correspondence with the image, it can be relatively easy to manipulate the bit map. For example, a matrix representing the bitmap can be easily manipulated, e.g., rotated. The image form can be compressed, e.g., to a GIF or JPEG image. This compressed image, however, loses the one-to-one correspondence and hence cannot be directly processed as easily.

One aspect of the present system is to store the image as a compressed image, and most preferably as polygons. The software package, Adobe Streamline (TM), breaks a bitmap into multiple polygons. The polygons can then be defined as vectors. An additional advantage is that the vectors can be easily processed by the DSP. The DSP 800 then builds the image from the vectors. Since the image is defined as vectors, it can be easily handled via matrix arithmetic. Using Adobe Streamline, for example, an 800 kilobyte bit map can be compressed to a 30 kilobyte vector image.

Another improvement of the present system is the control of the gobo using filters.

In an analog gobo system, a filter can be used to blur the image representing the gobo, for example. Many different kinds of filters are used. For example, some filters randomly distort the image. Other filters affect the image in different ways. The blurring can be carried out as an electronic filter. A preferred user interface defines the filter as a separate gobo that is multiplied, e.g., AND ed, or OR ed with the first gobo.

More generally, a filter can be used to alter the image in some way, e.g., scale the image, decay the image, or the like. The blur can be used to make the image apparently out of focus in some locations.

The filter uses a second gobo that simulates the effect of an analog filter. For example, one operation simulates the optical effect of the glass that forms the filter in an analog gobo. That glass is used to make a model that emulates the optical properties of the glass. Those optical properties are then manipulated through the matrix representing the gobo, thereby effecting a digital representation of the filter. In one aspect, the filter is considered as a separate gobo which is OR ed with the second gobo. In this case, the dual gobo definition described above can be used. Alternatively, the filter can simply be added to the gobo-defining matrix.

This definition has the advantage that it avoids defining a totally separate control. The filters are each defined as one specific gobo. A user manual which defines gobos is used. This manual has filters added to it. This avoids the need for a separator user manual of filters.

Another aspect defined by the present system is gobos that load and execute code. Some images cannot be described in terms of control. For example, images may be defined as some random input. Some images progress with time and maintain no record of their previous state. These images can be defined in terms of code and in terms of a progression from one time to another. Hence, the gobos that load and execute code define a gobo that includes an associated area to hold static values.

A gobo is requested. The code and variables that are associated with that gobo are copied into RAM. The variables are initially at a preset state. The code that is in the gobo portion is executed, using the portions in the variables. The variables are modified at each pass through the portion.

Yet another feature of this system is intensity control over aspects of the image defining the gobo and dimming of the image defined thereby. Returning to the example of a bit map with 24-bit color, such a system would include 8 bits of red, 8 bits of green, and 8 bits of blue. It can be desirable to fade the image while keeping the color constant with intensity change.

One system uses an experimental technique i.e. that is one that relies on experimentation, to determine how to fade in order to maintain constant color. A look-up table is formed between the constant color and the look up table. In this way value Bx, Gx, Bx represents color 1 at intensity X. Ry, Gy, By represent the color at intensity y.

Another system directly maps the bits to color by defining the map as chrominance using techniques from color television. For example, this takes the bits, and converts the values indicating image to color or chrominance (C) and image luminance (Y) of the image. The conversion between RGB and Y/C is well known. The values of Y and C which correspond to the chrominance and luminance are then stored. The image gobo can then be dimmed by reducing the Y, while keeping C the same. If desired, the Y/C can be converted back to RGB after dimming. The dimming however, may change the "look" of the color being projected. This system allows the color to be changed based on intensity.

Another system allows reducing the number of bits for a bitmap. Say, as an example, that it is desired to use a total of 8 bits to represent each pixel of the image. This could then be apportioned between the desired bits with red having 3 bits, green having 3 bits, and blue having 2 bits. This limits the amount of information in any of these colors. Since there are only 2 bits for blue, there are only four levels of blue that can be selected. This is often insufficient.

In this system, therefore, the bits are compressed by assuming that each two adjacent lines have exactly the same values. Hence, each two lines get the same color value (but can have different intensity values). Now in a system as described above, two lines of red can have 5 bits, two lines of green can have 6 bits, and two lines of blue can also have 5 bits. This provides an appropriate dynamic range for color at the expense of losing half the resolution for color.

Moreover, this has an additional advantage in that it allows 5 bits for grey scale in such a system.

A possible problem with such a system, however, as described above, is that the information would not necessarily be aligned on byte boundaries. It could, therefore, be necessary to take the whole image, manipulate it, and then put the whole image back.

Figure 9:
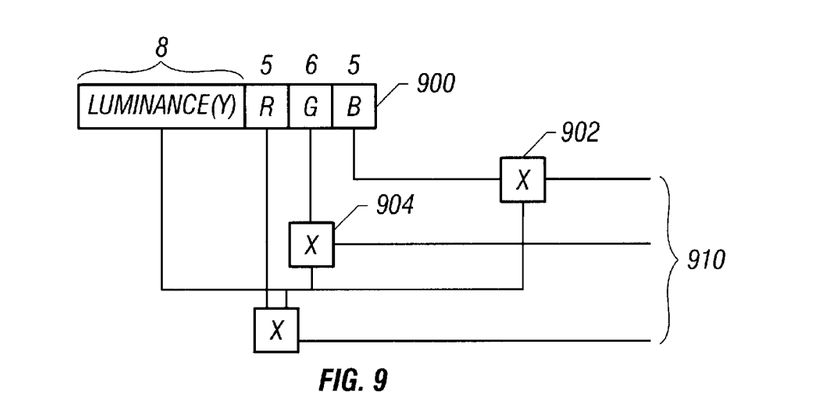
FIG. 9 shows intensity-sensitive color control elements.

The basic system is shown in FIG. 9. The luminance Y is an 8-bit representation of the brightness level of the image. The hue is then divided into dual-line multiple bits. Each value is used for two lines each.

Dimming in such a system is carried out as shown in FIG. 9. For example, the blue bits 900 are multiplied in a hardware multiplier 902 by the luminance. Similarly, the green is multiplied in a second hardware multiplier 904 by the same luminance value. This controls the relative levels of red, green, and blue that are output on the RGB lines 910.

The multipliers that are used are very simple, since they simply multiply 8 bits by 3 bits. Therefore, a relatively simple in structure hardware multiplier can be used for this function.

This provides red, green, and blue color without loss of data and with substantially perfect fading.

Figure 10:
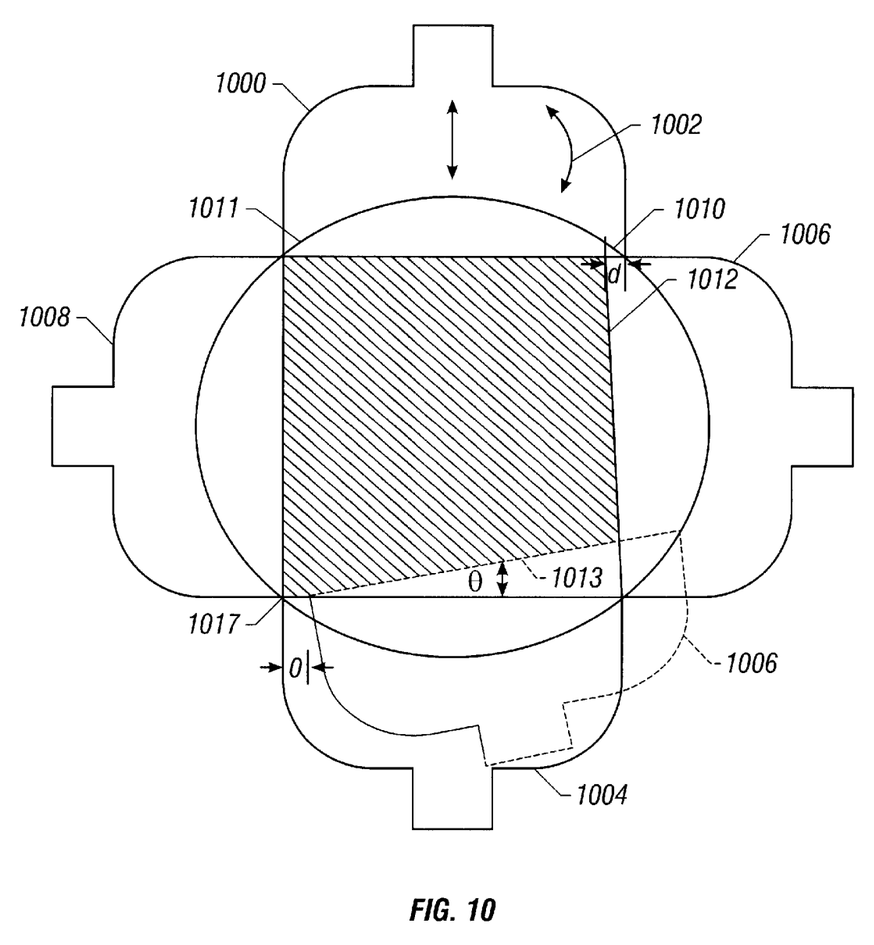
FIG. 10 shows control of a framing shutter.

An additional feature described herein is a framing shutter gobo. A basic framing shutter is shown in FIG. 10. FIG. 10 shows the circular spot of the beam, and the analog shutter, often called a LECO. Each analog shutter 1000 can be moved in and out in the direction of the arrows shown. Each shutter can also be moved in an angular direction, shown by the arrow 1002. There are a total of four shutters, which, in combination, enable framing the beam to a desired shape. For example, the shutter 1004 can be moved to the position shown in dotted lines as 1006. When this happens, the effective image that is passed becomes as shown in hatched lines in FIG. 10. Another possibility is that the shutter can be tilted to put a notch or nose into the window around the image.

According to this system, a record is formed for a gobo defining a framing shutter. The framing shutter gobo allows control of multiple values including the positions of the four framing shutter edges 1000, 1004, 1006, and 1008. Each framing shutter is defined in terms of its value d, corresponding to the distance between one edge 1010 of the framing shutter and the edge 1011 of the original spot. In this system, the value d is shown representing the right-hand edge of the framing shutter. Another selectable value is θ, which defines the angle that the front blade 1013 of the framing shutter makes relative to perfect horizontal or vertical. Yet another parameter which can be selected is offset o which represents the distance between the framing shutter edge 1010 and the ideal edge portion 1017. Other values can alternatively be specified. By controlling all these values, the Medusa shutter can in effect simulate any desired framing shutter by using an electronic gobo.

A number of different special gobos are defined according to the present system. Each of these gobos is defined according to the record format described above.

These include:

Oscilloscope. This enables simulating the output value of an oscilloscope as the gobo. For example, any value that can be displayed on the oscilloscope could be used as a gobo with a finite width. This could include sine waves, square waves, straight waves, sawtooth waves, and the like.

Other variable gobos include vertical lines, moire lines, laser dots, radial lines, concentric circles, geometric spiral, bar code, moon phases, fowers and rotating flowers, a diamond tiling within a shape, kaleidoscope, tunnel vision, and others.

Animated gobos correspond to those which execute codes described above. Some examples of these include, for example, self-animating random clouds; self-animating random reflections; self-animating random flames, fireworks; randomly moving shapes such as honeycombs, crosswords, or undulations; foam; random flying shapes.

Although only a few embodiments have been described in detail above, those having ordinary skill in the art certainly understand that modifications are possible.

What is claimed is:

1. A format for defining an overall gobo shape, comprising:
    a first image of a gobo shape which defines an outline of a pattern within which light is passed and outside of which light is not passed;
    a second image defining a second gobo shape; and
    a third information part which defines information about the intersection between the first image and the second image.

2. A format as in claim 1 wherein said third information is color information which is independent of color information for the first image and for the second image.

3. A format as in claim 1 wherein said intersection is an "or" operation between the images.

4. A method of displaying multiple gobos, comprising:
    defining first and second gobos which intersect at an intersection area; and
    displaying said intersection area in some form other than an addition or subtraction between the first and second gobos between the two positions.

5. A method as in claim 4 wherein said other form is an OR.

6. A method as in claim 4 wherein said other form is one of an OR, an exclusivor, or a hysteresis induced combination.

7. A method as in claim 4 further comprising defining colors for said first and second gobos, and a different color for said intersection area, said different color being independent of said color of said first and second colors.

8. A method of controlling a gobo, comprising:
    determining a first set of values representing primary colors which represent a specified color effect at a first intensity;
    determining a second set of values of primary colors, different than said first set of values of primary colors, which represent said specified color effect at a second intensity different than said first intensity; and
    using said values to create a display having a first set of colors at said first intensity and said second set of colors at said second intensity.

9. A method as in claim 8 further comprising storing said sets of values in a look up table.

10. A color changing device, comprising:
    a look up table, which stores a first set of primary color data information representing a first color effect at a first light intensity, and also stores a second set of second primary color data information representing said first color effect at a second light intensity different than said first intensity and wherein said first and second primary color sets are different; and
    a color changing element which changes a color of said light based on information in said look up table.

11. A device as in claim 10 further comprising a digital mirror device, changing a shape of projected light.

12. A method of coloring light, comprising:
    determining an available number of bits for color in each unit of a light signal having a plurality of units representing a digital gobo; and combining two units of light signals together to form a combined signal having the same colors described by double the numbers of bits, and using said combined signal to drive said two units of light signals.

13. A method of forming a framing shutter using a digital mirror, comprising:

defining an angle relative to a first reference and a distance value relative to a second reference for a framing shutter; and controlling a digital mirror to form a part of a framing shutter according to said angle value and said distance value.

14. A method as in claim 13 further comprising defining an offset value for said framing shutter.

15. A method as in claim 14 further comprising a plurality of additional angle values and distance values, collectively forming the outside of a framing shutter.

16. A method as in claim 13 wherein said first reference is an edge, and said distance value is distance of a desired framing shutter from said edge and said second reference is relative to a specified axis, and said angle value represents an angle of a desired framing shutter relative to said specified axis.

17. A method as in claim 16 wherein said specified axis is horizontal or vertical.

18. A method of forming a framing shutter using a digital mirror, comprising:

using said digital mirror to simulate edges of the framing shutter, each edge having a specified distance from a respective reference edge and each edge having an angle relative to a respective reference axis, for a desired framing shutter, which collectively define an outer edge of a frame.

* * * * *